G. W. TRIBBEY.
ICE CUTTER.
APPLICATION FILED MAR. 30, 1917.
1,265,976.
Patented May 14, 1918.
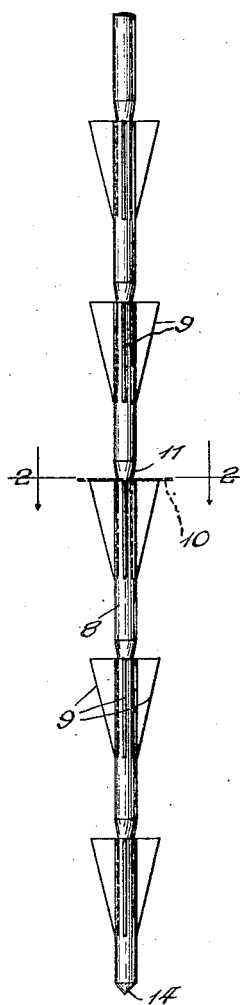
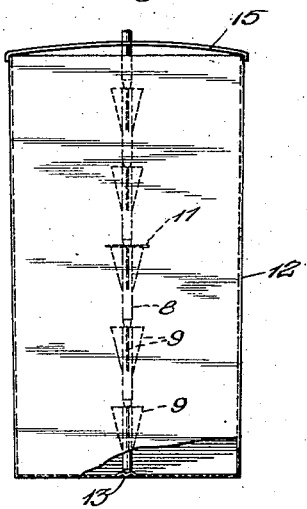
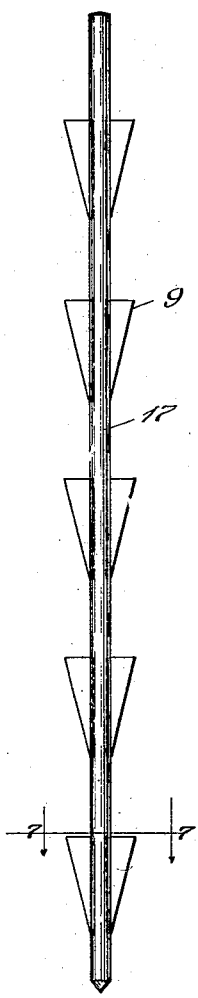
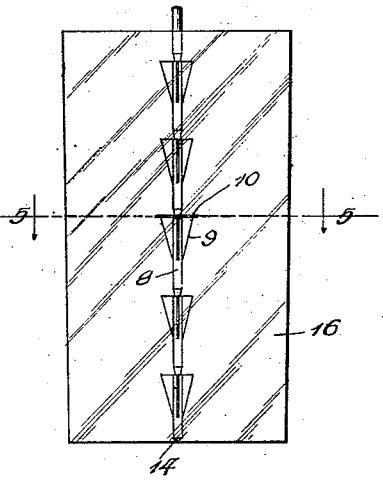
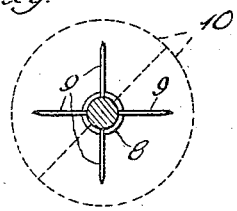
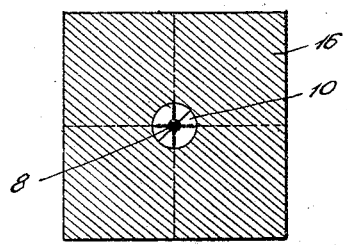
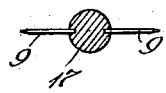
Inventor,
George W. Tribbey,
By Glenn S. Noble,
Atty.
Witness:

UNITED STATES PATENT OFFICE.

GEORGE W. TRIBBEY, OF MARSHFIELD, OREGON.

ICE-CUTTER.

1,265,976.  Specification of Letters Patent. Patented May 14, 1918.

Application filed March 30, 1917. Serial No. 158,632.

*To all whom it may concern:*

Be it known that I, GEORGE W. TRIBBEY, a citizen of the United States, residing at Marshfield, in the county of Coos and State of Oregon, have invented certain new and useful Improvements in Ice-Cutters, of which the following is a specification.

A large amount of ice is usually wasted in cutting or breaking large cakes into smaller pieces suitable for ordinary use; furthermore, considerable time and labor is required in cutting large pieces of ice into smaller pieces which may be more readily handled.

The present invention relates to devices or means for cutting ice; and more particularly to devices or means which may be inserted in the water before it is frozen and will be embedded in the ice preparatory for cutting or severing the same.

The objects of this invention are to provide a simple and efficient device or apparatus for cutting ice; to provide a device of this character which may be embedded in the ice and which will cut or sever the ice when struck a suitable blow; to provide a device which may be embedded in a cake of ice and will serve to cut the same into a plurality of pieces; and in general to provide such an improved ice cutting device as will appear more fully from the following description.

In the accompanying drawings illustrating this invention:

Figure 1 is a side view showing one form of the invention;

Fig. 2 is an enlarged cross sectional view taken on the line 2—2 of Fig. 1;

Fig. 3 is a side view of a can or receptacle with the cutter inserted therein, preparatory for forming a cake of ice;

Fig. 4 is a side view of a cake of ice showing my cutter embedded therein;

Fig. 5 is a cross sectional view taken on the line 5—5 of Fig. 4;

Fig. 6 is a side view showing a slightly modified form of construction; and,

Fig. 7 is a sectional view taken on the line 7—7 of Fig. 6.

In accordance with this invention, I provide a suitable cutting, severing, or breaking member which is inserted in the water and will be embedded in the ice when the water is frozen and will serve to cut the ice when the device is acted upon, as by being struck with a hammer. As shown in the drawing, 8 represents a shaft or rod which is provided with one or more cutting blades or wings 9. As shown in Figs. 1 to 5, the blades are arranged in oppositely disposed pairs so that they will cut in four directions from the center of the shaft. This arrangement is desirable for cutting a cake of ice into four pieces or columns. The blades 9 may be secured to the rod 8 in any desired manner, or may be formed integrally therewith. These blades are also preferably made of substantially triangular shape, tapering from the bottom toward the top. The outer or cutting edges of the blades are preferably sharpened.

In some instances it may be desirable to cut the ice transversely as well as longitudinally. In order to do this I provide horizontally arranged blades 10, preferably of semi-circular form, which rest loosely on the upper ends of the blades 9. The rod or shaft 8 is tapered, as indicated, at 11, adjacent to the tops of the blades 9 so that when it is driven downwardly it will force the blades 10 outwardly to cut the ice transversely. These transverse cutters may be arranged at one or more places as desired.

The cutter may be held in the water in any desired manner. For instance, as shown in Fig. 3, the can or receptacle 12 in which the water is to be frozen, is provided at the center of the bottom with a depression 13 for receiving the sharpened end 14 of the rod 8. A cross piece such as a metal strap 15 extends across the top of the can and engages with the upper end of the rod to hold it in central position. The cutter having been positioned in the can in this manner, will be embedded in the cake of ice 16, and will serve to strengthen the cake of ice while it is being handled. When it is desired to cut the cake in pieces, the upper end of the rod is struck with a hammer which tends to drive it inwardly. A very slight movement causes the cutters to cut on the ice and with the arrangement shown in Figs. 4 and 5, the cake will be severed into four portions longitudinally, and these longitudinal portions will also be severed transversely by the centrally arranged cutters 10. I have found in actual practice that cakes of ice may be cut in this manner with but little effort and with practically no waste.

In the modified form of construction shown in Figs. 6 and 7, the rod or shaft 17 is only provided with oppositely disposed pairs of blades, so that the ice would be cut in one direction only.

This invention contemplates the use of the cutter wherever it may be applicable, and I therefore do not wish to limit myself to the particular use herein set forth. Furthermore, the form of the device may be changed and the parts differently arranged without departing from the invention; therefore I do not wish to limit myself to the exact constructions herein shown and described, except as set forth in the following claims in which I claim:

1. An ice cutter adapted to be embedded in the ice to be cut, comprising a shaft with one or more projecting thin blades adapted to sever the ice.

2. An ice cutter adapted to be embedded in the ice to be cut, comprising a shaft having one or more triangular sharpened blades.

3. In a device of the character set forth, the combination of a shaft having a plurality of radially arranged cutting blades with their cutting edges tapering from the lower ends outwardly to the upper ends.

4. An ice cutter comprising a shaft having longitudinally arranged blades affixed thereto, and having transverse blades with means for forcing the transverse blades outwardly by the longitudinal movement of the shaft.

5. An ice cutter of the character set forth, comprising a shaft having a plurality of triangular, longitudinally arranged cutting blades, said shaft being tapered adjacent to the upper ends of said blades, and a transverse cutter blade adapted to rest on the upper ends of the longitudinal blades and to be forced outwardly by the tapered portion of the shaft.

6. The combination with a can for receiving water to be frozen, of an ice cutter adapted to be placed in the can to be embedded in the ice, and means for holding said cutter in adjusted position in the can while permitting the removal thereof with the ice.

7. The combination with a receptacle for holding water to be frozen, of a socket in the bottom of the receptacle, an ice cutter comprising a rod having thin blades and having its lower end adapted to fit in said socket and extending upwardly to the top of the receptacle, and means for holding the upper end of the cutter in position.

GEORGE W. TRIBBEY.

Copies of this patent may be obtained for five cents each, by addressing the "Commissioner of Patents, Washington, D. C."